| United States Patent Office | 2,737,850
Patented Mar. 13, 1956 |
|---|---|

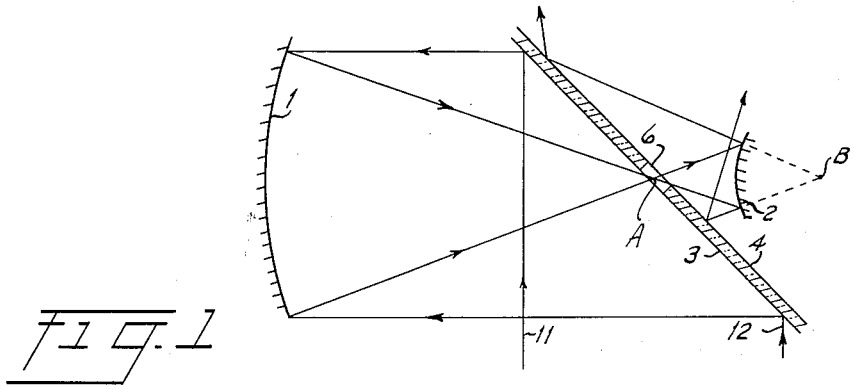
Fig. 1
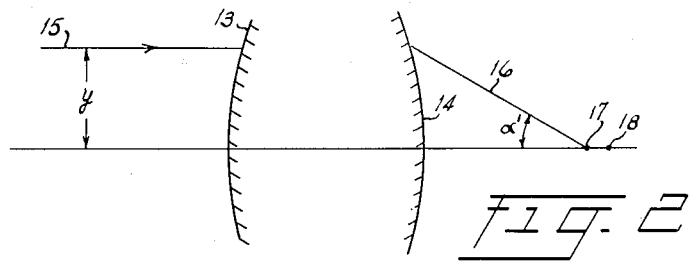
Fig. 2
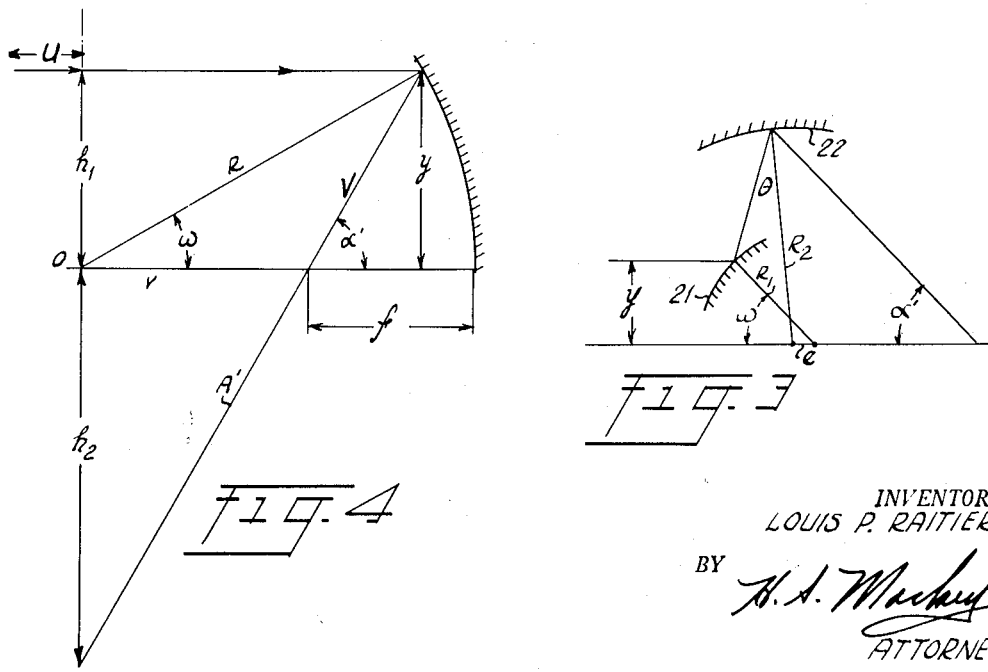
Fig. 3
Fig. 4
INVENTOR.
LOUIS P. RAITIERE
BY
ATTORNEY.

2,737,850

WIDE APERTURE DIVERGENT OPTICAL SYSTEM USING SPHERICAL MIRRORS

Louis P. Raitiere, Pleasantville, N. Y., assignor to General Precision Laboratory Incorporated, a corporation of New York Application December 11, 1952, Serial No. 325,309

7 Claims. (Cl. 88—57)

This invention relates to a divergent radiant energy directing system. Although it finds its greatest use in an optical environment it has novel aspects which are applicable to use with invisible radiation such as infrared, ultra-violet and microwave radio energy.

The outsanding feature of the system is that it produces a very small amount of aberrations. It is because of a substantial absence of chromatic aberrations that the system is particularly adaptable to a wide range of wavelengths, from ultra-violet to infra-red, for example.

It is a basic, well-known fact that reflective elements such as mirrors are far superior to refractive elements such as lenses in optical systems from the standpoint of spherical aberrations, coma and chromatic dispersion. As far back as 1672 Newton invented the reflecting microscope and this microscope rivalled the refracting microscope until the first of the 19th century when the achromatic reflecting microscope was developed. Heretofore, the reflecting microscope had been superior because of the absence of its chromatic aberrations although it had certain other disadvantages such as a high coefficient of obstruction. In other words, although heretofore, reflective systems had been superior from a standpoint of aberrations they had been inferior from the standpoint of their obstructed area.

Within the last century, much work has been done with reflective systems because of their recognized advantages and attempts have been made to overcome some of their disadvantages by the use of aspheric surfaces. The aspheric surfaces not only introduce other errors but also increase the difficulty of manufacture because it is inherently much easier to develop true surfaces of revolution.

Because of the inherent nature of reflecting systems reflecting surfaces must necessarily face each other with one surface in front of the other. This necessarily reduces the numerical aperture. However, in convergent reflective systems the obstruction coefficient is not so great as to be a serious disadvantage. However, the full potentialities of a simple combination of spherical mirrors has not been fully realized heretofore, probably because of the difficulty of computation and the misleading influence of theory.

Accordingly, it has heretofore been considered by those highly skilled in the optical art that divergent reflective systems having any substantial numerical aperture were impossible to produce. However, in accordance with the present invention it has been discovered that one of the possible solutions of mathematical equations involving the computation of these reflective systems indicates that a divergent system would be possible assuming that the light rays could be brought to bear upon the reflecting surfaces. One of the essential features of the present invention is the provision of a system of bringing these light rays to bear on the reflecting surface without at the same time introducing any new aberrations.

One of the primary objects of the invention is to provide a novel divergent radiant energy directing system in which the usual aberrations and the coefficient of obstruction are minimized while at the same time the numerical aperture is a maximum.

Another object is to provide a divergent optical system using spherical mirrors in such a manner that the inherent aberrations tend to cancel each other.

Another object is to provide an improved divergent optical system having a very small coefficient of obstruction.

Another object is to provide an improved radiant energy directing system which has minimum aberrations over a very wide range of wavelengths.

A still further object is to provide an improved divergent optical system utilizing two spherical mirrors with inherently small aberrations with which a suitable condensing system can be used to produce a real image with substantially only the aberrations of the condensing system.

Other and further objects will become readily apperent from the following description when taken in connection with the accompanying drawings in which:

Fig. 1 is a schematic illustration of an improved optical system made in accordance with the present invention: and Figs. 2, 3 and 4 are diagrammatic illustrations for the purpose of facilitating the explanation of the invention.

A radiant energy direction system embodying the basic elements of the present invention is shown in Fig. 1. Fundamentally, the physical components comprise a concave spherical surface 1 and a convex spherical mirror surface 2 facing each other in nested relation with their respective centers of curvature arranged on a common axis as shown. The surfaces 1 and 2 are substantially concentric about a common point B. As pointed out hereinafter, if the surfaces are exactly concentric the system will be aplanatic but the residual aberrations can be controlled in a desired manner by introducing extremely small eccentricity in accordance with the mathematical relations set forth. Interposed between the mirrors 1 and 2 are plane mirror surfaces 3 and 4 arranged in contiguous parallel relation and facing mirror surfaces 1 and 2, respectively. The mirror surfaces 3 and 4 are preferably arranged at an angle of 45° with respect to the common optical axis of the mirror surfaces 1 and 2, the mirror surfaces 3 and 4 having respective central openings indicated by the common opening 6 centered on the focal point A of the mirror surface 1.

The general direction of the reflection of light by the system is illustrated by a pair of light rays 11 and 12, assuming the direction to be indicated by the arrow heads.

The system is reversible but in either direction virtual images will be formed and therefore some type of condensing system would have to be used with the divergent system in order to form real images. Although the physical components are very simple, as shown, there is a very critical relation between the radii of curvature of the two mirror surfaces 1 and 2, the distance between their centers of curvature and the position of the plane mirror surfaces 3 and 4.

Referring to Fig. 2 representing an elementary optical system, spherical aberration can be illustrated by considering the incident light ray 15 passing through a refracting element represented in general by the two optical surfaces 13 and 14. The refracted ray 16 intersects the optical axis at 17, which is at the image point corresponding to the incident ray 15, while the paraxial, or Gaussian image point is at 18. Then the distance between points 17 and 18 represents the spherical aberration. According to the well known sine law $$\frac{y}{\sin \alpha'} = f\sigma \tag{1}$$

where ($y$) is the distance between the parallel incident ray 15 and the optical axis and determines the aperture of the optical system; $\alpha'$ is the angle the refracted ray 16 makes with the optical axis; ($\sigma$) is a constant coefficient of residual aberration of such value that ($\sigma-1$) represents the departure from the sine condition; and ($f$) is the focal length.

It is a convenient fact that two spherical mirrors can be used in a radiant energy directing system in such a manner that the spherical aberration of the two mirrors for a wide range of radii can be made to substantially neutralize each other with a reasonably high numerical aperture although the obstruction coefficient is usually about 45 per cent of the numerical aperture.

These prior systems are substantially monocentric, that is, there is a common center for the radii of the spherical mirror surfaces. Under this condition the coma produced by both mirrors is substantially equal and opposite although the central obstruction is large.

Perhaps because of the misleading influence of theory it was heretofore considered that no appreciable deviation from the monocentric design could be tolerated. Also, in accordance with conventions described hereinafter, these prior systems dealt only with convergent systems since it was considered that divergent systems were not possible because of the almost total theoretical obstruction.

Writers differ in their conventions regarding the signs of conjugate focal distances and radii of curvature. However, for purposes of consistency in the description of this invention, the following rule as explained in connection with Fig. 4 will be applied.

The center of curvature of an optical surface such as the point O in Fig. 4, is taken as the origin of the ordinates. Then, ($u$) is the abscissa of the object; ($v$) is the abscissa of the image; and ($r$) is the radius of curvature.

The relation in a two-mirror system such as shown in Fig. 3 may be derived from the fundamental aspects of a single concave mirror illustrated in Fig. 4. Basic physics relating to concave mirrors gives $$\frac{1}{u} + \frac{1}{v} = \frac{2}{r} \tag{2}$$

If the source is at a great distance from the mirror the incident wave is practically plane and ($u$) is infinite. The corresponding value of ($v$) is called the principal focal distance ($f$)

Equation 2 then becomes $$\frac{1}{\infty} + \frac{1}{f} = \frac{2}{r}, \text{ or } f = \frac{r}{2} \tag{3}$$

Passing from the generalized condition to a two-mirror system, such as that shown in Figure 3, it is possible to determine the parameters of the system from the following basic equations $$y^2(\sigma^2+1-2\sigma p)\rho_1{}^2 - y^2(1-\sigma p)\rho_1 - \sigma^2 q^4 = 0 \tag{4}$$

$$p = \cos \tfrac{1}{2}\alpha' \tag{5}$$

and $$q = \sin \tfrac{1}{2}\alpha' \tag{6}$$

where ($y$) and ($\sigma$) represent the quantities indicated above and $\rho_1$ is the reciprocal of the radius of curvature.

When the aperture of such a system is selected the ordinate ($y$) is determined. The maximum limit of coma determines $\sigma$. From the sine law, as expressed in Equation 1, the relation between $y$, $\sigma$ and $\alpha'$ is known.

Referring to the specific two-mirror system of Fig. 3 the convex mirror 21 corresponds to the mirror 2 of Fig. 1 and concave mirror 22 corresponds to mirror 1 of Fig. 1. Also the angle $\alpha'$ of Figs. 3 and 4 corresponds to angle $\alpha'$ of Fig. 2.

Then selecting a focal length of unity for convenience Equation 1 becomes $$y = \sigma \sin \alpha' \tag{7}$$

From Equations 5, 6 and 7 the values of ($p$) and ($q$) can be determined. Also the variable $\rho_1$ is the curvature of the convex mirror 21, that is, the reciprocal of the radius of curvature. Likewise, $\rho_2$ is the curvature of concave mirror 22. This leaves the two roots $\rho_1$ and $\rho_2$, the coefficient of eccentricity, and the spacing between the respective centers of curvature to be determined.

Applying these basic laws to the mirror system of Fig. 3, and substituting in Equation 5 gives $$y\rho_1 = \sin \omega_1 \tag{8}$$

and $$y\rho_2 = \sin \omega_2 \tag{9}$$

where $\omega_1$ and $\omega_2$ are the respective angles between the normals (radii) to the respective surfaces at the points of incidence and refraction, respectively.

From the relations of the triangles in Fig. 4

$$h_2 = -\frac{(1-\cos \omega_1)}{1-\sigma \cos \omega_1}\sigma \tag{10}$$

where $h_2$ is a coefficient of eccentricity.

If a value of unity is selected for $\sigma$, and if $\omega \neq 0$, then $h_2 = -1$. In the two mirror systems of Fig. 3, this would mean that the mirror surfaces 21 and 22 were concentric.

With the two-mirror system of Fig. 3 and with the incident ray coming from an infinite distance and with the centers of the mirror surfaces 21 and 22 separated by an amount ($e$) the diagram of Fig. 4 supports the relations $$1 + h_2 = 2\rho e \tag{11}$$

and $$1 = 2h_2 \, \rho_2 + 2\rho_1 \tag{12}$$

where ($e$) is the separation between the centers of curvature of the spherical mirror surfaces.

To provide a wide aperture while at the same time keeping coma and spherical aberration at a minimum, the convex mirror 21 directs rays against the concave mirror 22. As the angle $\theta$ decreases, $\alpha'$ increases.

Taking an example, assuming an equivalent focal length of unity, $y = 0.50$ and $\sigma = 0.98195$.

Using Equations 3, 4 and 5

$$\rho_1 = +1.01838$$
$$h_2 = -0.88345$$
$$e = 0.05722$$

and $$\rho_2 = +0.58677$$

this gives $$r_1 = +0.98195$$
$$r_2 = +1.70424$$

In this case the image is beyond the center of curvature and the system is convergent.

It has already been mentioned that ($\sigma-1$) represents the offence against the sine condition. When $\sigma = 1$ the system will be aplanatic, that is, the system will be corrected for spherical aberration and the sine condition. The basic Equation 2 then becomes $$2y^2(1-p)\rho_1{}^2 - y^2(1-p)\rho_1 - q^4 = 0 \tag{13}$$

Since aplanatic systems are concentric $h_2 = -1$ and $e = 0$.

Again assuming $y = 0.50$ and solving for radii of curvature $$\rho_1 = -0.32086$$
$$\rho_2 = -0.82086$$

This gives $$r_1 = -3.16$$
$$r_2 = -1.1215$$

The negative values indicate that the radius of curvature of the first mirror is more than twice that of the second and therefore the focal point of the concave mirror is between the two mirrors, since the mirrors have a common center of curvature. Accordingly, the focal point of the convex mirror is virtual with the concave mirror producing almost total obstruction of rays of the virtual image.

In accordance with the present invention the plane mirrors 3 and 4 are arranged with their common aperture 6 centered on focal point A of the concave mirror 1, thus providing means for directing light rays against the concave mirror 1 and directing the reflected rays from convex mirror 2 with substantially zero coefficient of obstruction. Also the aberrations will be very small. By choosing some values of $\sigma < 1$ the spherical aberration can be improved with some coma.

The foregoing discloses an improved divergent optical system which uses no refraction elements and can be made aplanatic or non-aplanatic at will.

What is claimed is:

1. A divergent, aplanatically adjusted optical system of wide aperture, comprising a spherical concave reflecting surface and a spherical convex reflecting surface arranged in substantially concentric relation about a common center on a common optical axis, the relative radii of said spherical surfaces being such that the focal point of said concave surface is between said spherical surfaces, two parallel opaque plane reflecting surfaces facing the respective spherical surfaces and inclined to said optical axis, said plane surfaces having respective central transparent areas surrounding said optical axis.

2. A divergent, aplanatic optical system of wide aperture, comprising a spherical concave reflecting surface and a spherical convex reflecting surface arranged in substantially concentric relation about a common center on a common optical axis, the relative radii of said spherical surfaces being such that the focal point of said concave surface is between said spherical surfaces, two parallel opaque plane reflecting surfaces facing the respective spherical surfaces and inclined to said optical axis, said plane surfaces having respective transparent areas surrounding said optical axis and substantially centered at said focal point, said transparent areas being provided to permit light to be reflected from one plane surface to the other by way of said spherical surfaces with a minimum of obstruction.

3. A divergent, aplanatically adjusted optical system of wide aperture comprising, a spherical concave reflecting surface and a spherical convex reflecting surface arranged in substantially concentric relation about a common center on a common optical axis, the relative radii of said spherical surfaces being such that the focal point of said concave surface is between said spherical surfaces, two parallel opaque plane reflecting surfaces facing the respective spherical surfaces and inclined to said optical axis, said plane surfaces having respective central transparent areas, substantially centered at said focal point, said focal point of said concave surface being so located relative to said convex reflecting surface that light rays passing through said transparent areas and reflected from one point on said convex surface will not be obstructed by any other point on said convex surface.

4. A combination as set forth in claim 3 in which said plane surfaces are inclined at substantially 45° to said optical axis.

5. A divergent, aplanatically adjusted optical system comprising, a spherical concave reflecting surface against which parallel light rays are incident, a spherical convex reflecting surface substantially concentric with said concave surface, the radius of curvature of the surface receiving the incident light and the eccentricity of said concave and convex surfaces being determined by the following equations:

$$y^2(\sigma^2+1-2\sigma p)\rho_1{}^2 - y^2(1-\sigma p)\rho_1 - \sigma^2 q^4 = 0$$

and $$2\rho_1 e - 1 = -\frac{(1-\cos \omega_1)}{1-\sigma \cos \omega_1}\sigma$$

where $y$ is the distance between a parallel incident ray and the optical axis;

$$p = \cos \tfrac{1}{2}\alpha'$$
$$q = \sin \tfrac{1}{2}\alpha'$$

$\alpha'$ being the angle between the refracted light ray and the optical axis; $\omega_1$ is the reciprocal of the radius of curvature of the optical surface receiving the incident light; $\sigma$ is a coefficient of residual aberration of such value that $(\sigma - 1)$ represents the departure from the sine condition; $\omega_1$ is the angle between the normal (radius) to the surface receiving the incident light at the point of incidence and the optical axis; and $e$ is the distance between the centers of curvature of said convex and concave surfaces, and opaque parallel plane reflecting surfaces between said spherical reflecting surfaces for reflecting light in opposite directions, said plane reflecting surfaces having respective transparent areas surrounding the optical axis of said system.

6. An optical system as described in claim 5 in which said plane reflecting surfaces are arranged at an angle of substantially 45° with respect to said optical axis.

7. An optical system as defined in claim 5 in which said plane reflecting surfaces are arranged at an angle of substantially 45° with respect to said optical axis and are centered substantially on the focal point of said concave mirror.

References Cited in the file of this patent

UNITED STATES PATENTS

| Number | Name | Date |
|---|---|---|
| 842,314 | Fery et al. | Jan. 29, 1907 |
| 2,198,014 | Ott | Apr. 23, 1940 |
| 2,212,211 | Pfund | Aug. 20, 1940 |
| 2,313,204 | Morrelle | Mar. 9, 1943 |
| 2,358,316 | Chwalow | Sept. 19, 1944 |
| 2,380,887 | Warmisham | July 31, 1945 |
| 2,476,124 | Van Alphen | July 12, 1949 |
| 2,482,115 | Laird | Sept. 20, 1949 |
| 2,490,052 | Harris | Dec. 6, 1949 |
| 2,490,747 | Creighton | Dec. 6, 1949 |
| 2,520,634 | Grey | Aug. 29, 1950 |
| 2,593,724 | Bouwers | Apr. 22, 1952 |
| 2,601,508 | Fastie | June 24, 1952 |